US011022950B2

(12) United States Patent
Martinez Canedo et al.

(10) Patent No.: US 11,022,950 B2
(45) Date of Patent: Jun. 1, 2021

(54) RESILIENT FAILOVER OF INDUSTRIAL PROGRAMMABLE LOGIC CONTROLLERS

(71) Applicant: Siemens Aktiengesellschaft, Munich (DE)

(72) Inventors: Arquimedes Martinez Canedo, Plainsboro, NJ (US); Zhen Song, Austin, TX (US); Mike Veldink, Pennington, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 58 days.

(21) Appl. No.: 16/495,603

(22) PCT Filed: Mar. 24, 2017

(86) PCT No.: PCT/US2017/023984
§ 371 (c)(1),
(2) Date: Sep. 19, 2019

(87) PCT Pub. No.: WO2018/174896
PCT Pub. Date: Sep. 27, 2018

(65) Prior Publication Data
US 2020/0050167 A1 Feb. 13, 2020

(51) Int. Cl.
*G05B 19/05* (2006.01)
*G06F 8/41* (2018.01)
(Continued)

(52) U.S. Cl.
CPC ............. *G05B 19/058* (2013.01); *G06F 8/41* (2013.01); *G06F 11/142* (2013.01);
(Continued)

(58) Field of Classification Search
CPC .............. G06F 11/142; G06F 11/1608; G06F 11/1629; G06F 11/1641; G06F 11/1637;
(Continued)

(56) References Cited

U.S. PATENT DOCUMENTS 4,358,823 A * 11/1982 McDonald .......... G06F 11/1641
714/11
4,890,284 A * 12/1989 Murphy .................... G05B 9/03
714/11
(Continued)

FOREIGN PATENT DOCUMENTS

EP 0518630 A2 12/1992

OTHER PUBLICATIONS

International Search Report dated Feb. 13, 2018; International Application No. PCT/US2017/023984 Filing Date: Mar. 24, 2017; 21 pages.

*Primary Examiner* — Gabriel Chu

(57) ABSTRACT

A method of performing failover for programmable logic controllers (PLCs) in an automation environment and controlling a physical system includes an input/output module receiving sensor inputs from field devices and creating a copy of the sensor inputs for a first group of PLC in a first PLC bank. The input/output module transfers the copy the sensor inputs to each PLC in the first group of PLCs and receives processing results from each PLC in the first group of PLCs in response to transferring the copy of the sensor inputs. The input/output module determines whether there are any inconsistencies between the processing results received from each PLC in the first group of PLCs. If there are any inconsistencies between the processing results received from each PLC in the first group of PLCs, a failover control process is initiated by sending a failover control message to a second input/output module.

16 Claims, 14 Drawing Sheets

(51) Int. Cl.
  *G06F 11/14* (2006.01)
  *G06F 11/20* (2006.01)
  *G06F 11/16* (2006.01)
(52) U.S. Cl.
  CPC .......... *G06F 11/1641* (2013.01); *G06F 11/20* (2013.01); *G06F 11/2028* (2013.01)
(58) Field of Classification Search
  CPC ...... G06F 11/165; G06F 11/20; G06F 11/202; G06F 11/2023; G06F 11/2028; G06F 8/41; G06F 8/44; G06F 21/12; G06F 21/14; G06F 21/54; G06F 21/60; G06F 21/70; G06F 21/76; G05B 9/03; G05B 19/058; G05B 2219/14014; G05B 2219/14015; G05B 2219/14016; G05B 2219/14017; G05B 2219/14018; G05B 2219/14019; G05B 2219/1402; G05B 2219/14021; G05B 2219/14022; G05B 2219/14023; G05B 2219/14024; G05B 2219/14025; G05B 2219/14026; G05B 2219/14027; G05B 2219/14028; G05B 2219/14029; G05B 2219/1403; G05B 2219/14031; G05B 2219/14032; G05B 2219/14033; G05B 2219/14034; G05B 2219/14132; G05B 19/056
  See application file for complete search history.

(56) References Cited

U.S. PATENT DOCUMENTS

| | | | |
|---|---|---|---|
| 2004/0006722 A1* | 1/2004 | Safford | G06F 11/1641 714/11 |
| 2004/0153709 A1* | 8/2004 | Burton-Krahn | G06F 11/2097 714/4.11 |
| 2006/0070017 A1* | 3/2006 | Hayashi | G06F 11/2025 714/3 |
| 2006/0136867 A1* | 6/2006 | Schneider | G06F 21/14 717/106 |
| 2007/0162906 A1* | 7/2007 | Chandhoke | G06F 9/485 718/100 |
| 2010/0275065 A1 | 10/2010 | Cornelius et al. | |
| 2010/0281459 A1* | 11/2010 | Betouin | G06F 21/14 717/106 |
| 2013/0125090 A1* | 5/2013 | Durand | G06F 8/30 717/106 |
| 2015/0294114 A1* | 10/2015 | Monahan | G06F 21/14 726/26 |
| 2017/0078455 A1 | 3/2017 | Fisher et al. | |

* cited by examiner

PLC1 FB Declaration

```
FUNCTION_BLOCK FB10
VAR
    PID_CONTROLLER_1: BYTE
    PID_CONTROLLER_2: WORD
END_VAR

BEGIN

BEGIN
IF (PID_CONTROLLER_1 <> PID_CONTROLLER_2) THEN ...
(* In the condition for the above IF/THEN
instruction, PID_CONTROLLER_1 is implicitly
converced to a variable of data type WORD *)
END FUNCTION BLOCK
```

Cyclic Variables Reordering

PLC2 FB Declaration

```
FUNCTION_BLOCK FB10
VAR
    PID_CONTROLLER_2: WORD
    PID_CONTROLLER_1: BYTE
END_VAR

BEGIN

BEGIN
IF (PID_CONTROLLER_1 <> PID_CONTROLLER_2) THEN ...
(* In the condition for the above IF/THEN
instruction, PID_CONTROLLER_1 is implicitly
converced to a variable of data type WORD *)
END FUNCTION BLOCK
```

*Fig. 10*

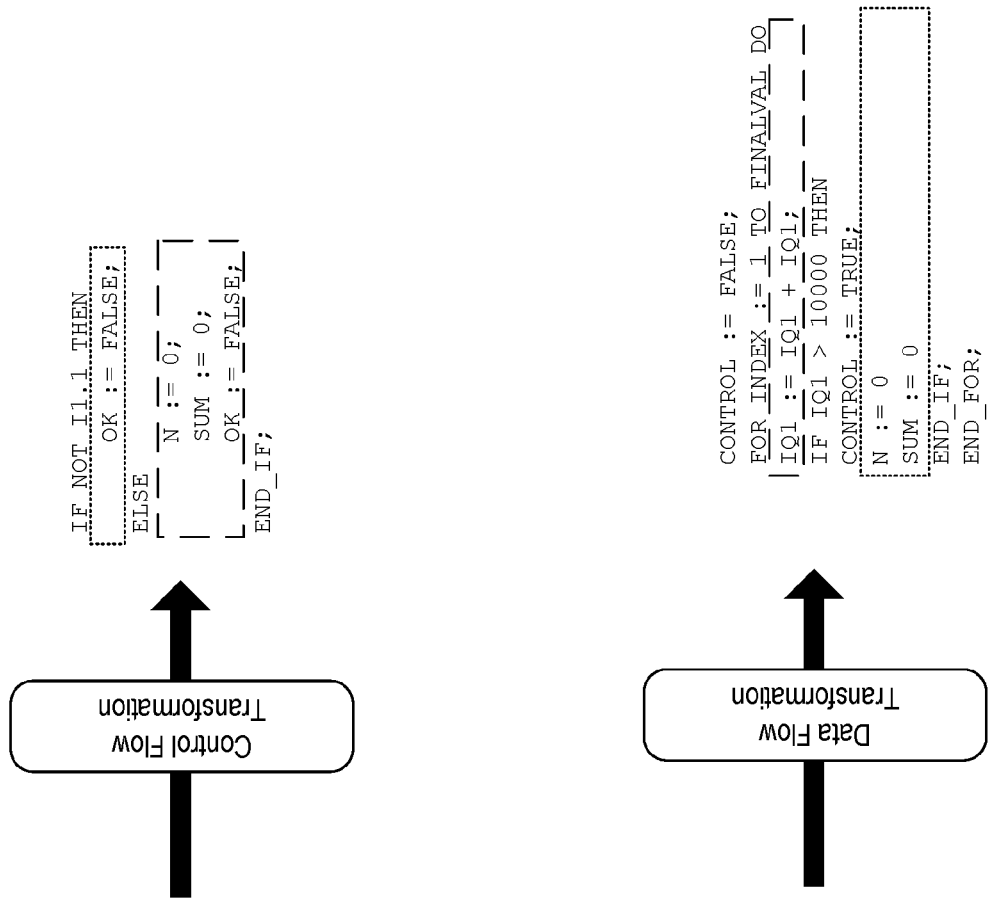

RESILIENT FAILOVER OF INDUSTRIAL PROGRAMMABLE LOGIC CONTROLLERS

TECHNICAL FIELD

The present invention relates generally to resilient failover of programmable logic controllers. The disclosed technology may be applied to, for example, various automated production environments where industrial controllers such as programmable logic controllers (PLCs) and distributed control systems (DCS) are used.

BACKGROUND

A programmable logic controller (PLC) is a specialized computer control system configured to execute software which gathers data on the state of input devices to control the state of output devices. A PLC typically includes three major elements: a processor (which may include volatile memory), volatile memory comprising an application program, and one or more input/output (I/O) ports for connecting to other devices in an automation system. As a part of process control, a PLC is used to monitor input signals from a variety of input points (input sensors) which report events and conditions occurring in a controlled process. For example, a PLC can monitor such input conditions as motor speed, temperature, pressure, volumetric flow and the like. A control program is stored in a memory within the PLC to instruct the PLC what actions to take upon encountering particular input signals or conditions. In response to these input signals provided by input sensors, the PLC derives and generates output signals which are transmitted via PLC output points to various output devices, such as actuators and relays, to control the process. For example, the PLC issues output signals to speed up or slow down a conveyer, rotate the arm of a robot, open or close a relay, raise or lower temperature as well as many other possible control functions too numerous to list.

The input and output points referred to above are typically associated with input modules and output modules, respectively. Input modules and output modules are collectively referred to as I/O modules herein. Those skilled in the art alternatively refer to such I/O modules as I/O cards or I/O boards. These I/O modules can, in some instances, be programmed in a similar way to the way a PLC is programmed using high-level languages.

PLCs must be resilient against faults and failures. These failures may be caused by hardware, software, and inputs. Conventional resilient PLC architectures rely on redundant hardware where, in the case of a PLC failure, the other PLC takes over execution and guarantees the continuity of the system and the control. There are also raising concerns on PLC cyber security where cyber-attacks can cause the PLC to fail, and trigger the resilience mechanisms Regardless on how the failure is created, the current resilient PLCs use identical binaries. There is a chance that if a failure causes the first PLC to crash, it may also cause the backup PLC to crash. Currently, there is no mechanism to protect against these so called "correlated" failures.

SUMMARY

Embodiments of the present invention address and overcome one or more of the above shortcomings and drawbacks, by providing methods, systems, and apparatuses related to resilient failover techniques for programmable logic controllers. More specifically, the techniques described herein describe a failover architecture which utilizes multiple banks, or groupings, of programmable logic controllers (PLC), allowing one bank of PLCs to failover to the second bank of PLCs. Additionally, in some embodiments, binaries of PLC software are randomized in each of the instances of a redundant PLC architecture. Because the PLC instances are executing different binaries, the overall system has more resilience than conventional systems with respect to cyber attacks.

According to some embodiments, a method of performing failover for PLCs in an automation environment and controlling a physical system includes an I/O module receiving sensor inputs from field devices and creating a copy of the sensor inputs for a first group of PLC in a first PLC bank. The I/O module transfers the copy the sensor inputs to each PLC in the first group of PLCs and receives processing results from each PLC in the first group of PLCs in response to transferring the copy of the sensor inputs. The I/O module determines whether there are any inconsistencies between the processing results received from each PLC in the first group of PLCs. If there are any inconsistencies between the processing results received from each PLC in the first group of PLCs, a failover control process is initiated by sending a failover control message to a second I/O module.

In some embodiments, the failover control process further comprises the first I/O module deactivating the first group of PLCs in the first PLC bank and disabling the output ports of the first group of PLCs in the first PLC bank associated with control of the physical system. Additionally, during the failover control process, the first I/O module may send a failover message to the second I/O module instructing the second I/O module to resume control and drop outputs for a predetermined number of cycles. This number of cycles may be, for example, specified as an integer value in the failover message. After the predetermined number of cycles, the second I/O module enable output ports of a second group of PLCs in a second PLC bank.

In some embodiments, the aforementioned failover control process further comprises sending a regeneration command to the first group of PLCs in the first PLC bank instructing the first group of PLCs to be reset. A PLC in the first bank selects a new control application binary file from a group of application binary files stored on the PLC in response to receiving the regeneration command. This new control application binary file is compiled into an executable file, which is executed. Additionally, a regeneration complete message is transmitted to the first I/O module. In some embodiments, each application binary file in the group of application binary files is distinct and functionally equivalent to other application binary files in the group. This may be achieved, for example, by randomizing a portion of the new control application binary file during compilation.

In some embodiments, the second I/O module transmits a new failover control message to the first I/O module. The first I/O module receives a regeneration complete message from each PLC in the first group of PLCs. Then, in response to receiving the new failover control message and the regeneration complete message, the first I/O module enables the output ports of the first group of PLCs in the first PLC bank.

In other embodiments of the present invention, a system for performing failover for programmable logic controllers in an automation environment and controlling a physical system includes two I/O modules. The first I/O module comprises a sensor input port, a duplicate inputs programming component, PLC input port, and a compare and drop programming component. The sensor input port is configured to receive sensor inputs from one or more field devices. The duplicate inputs programming component creates a copy of the sensor inputs for a first group of PLCs in a first PLC bank and transfers the copy the sensor inputs to each PLC in the first group of PLCs. The PLC input port receives processing results from each PLC in the first group of PLCs in response to transferring the copy of the sensor inputs. The compare and drop programming component is configured to determine whether there are any inconsistencies between the processing results received from each PLC in the first group of PLCs. If there are any inconsistencies between the processing results received from each PLC in the first group of PLCs, the compare and drop programming component initiates a failover control process by sending a failover control message to the second I/O module.

According to other embodiments of the present invention, a PLC includes a non-volatile memory storing a group of application binary files. Each application binary file is distinct and functionally equivalent to other application binary files in the group. The PLC further includes a regeneration programming component configured to, in response to receiving a regeneration command from an I/O module, select a new control application binary file from the group of application binary files. The regeneration programming component is further configured to compile the new control application binary file into an executable file, transmit a regeneration complete message to the I/O module and execute the executable file.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures:

FIG. 10 provides an illustration of cyclic variable reordering introduces binary changes to the PLC binary programs, according to some embodiments;

FIG. 11A illustrates a randomization through control flow transformation, according to some embodiments; and FIG. 11B illustrates a randomization through data flow transformation, according to some embodiments.

DETAILED DESCRIPTION

Systems, methods, and apparatuses are described herein which relate generally to resilient failover of programmable logic controllers. More specifically, the techniques described herein describe a failover architecture which utilizes multiple banks of programmable logic controllers (PLCs), allowing one bank of PLCs to failover to the second bank of PLCs. While processing occurs on the second bank of PLCs, the PLCs in the first bank are reset and reloaded with a new control application binary. As an additional measure of resiliency, the PLC may use randomized binaries that are functionally equivalent in resilient PLCs. Functional equivalence guarantees that for the same input, a randomized PLC program produces the same outputs as a non-randomized PLC program. In the case of a correlated failure, only one PLC crashes at a time. Moreover, randomization guarantees that other PLCs will not crash for the same correlated event (e.g., input, software error such as memory access violation, etc.). The systems described below, along with its related methods and apparatuses, are resilient with respect to at least the following features. First, there are no single points of security failure; if a PLC or I/O module fails, the systems can function properly and recover automatically. Secondly, the systems described herein are able to automatically recover after failure. Even if the binaries are different, other PLCs can take over execution and produce the same outputs while eliminating the risk of a correlated failure. Third, the systems provide resilience to 0-day cyber-attacks, thus providing meaningful protection while software patches can be developed to address cyber-attacks.

Figure 1:
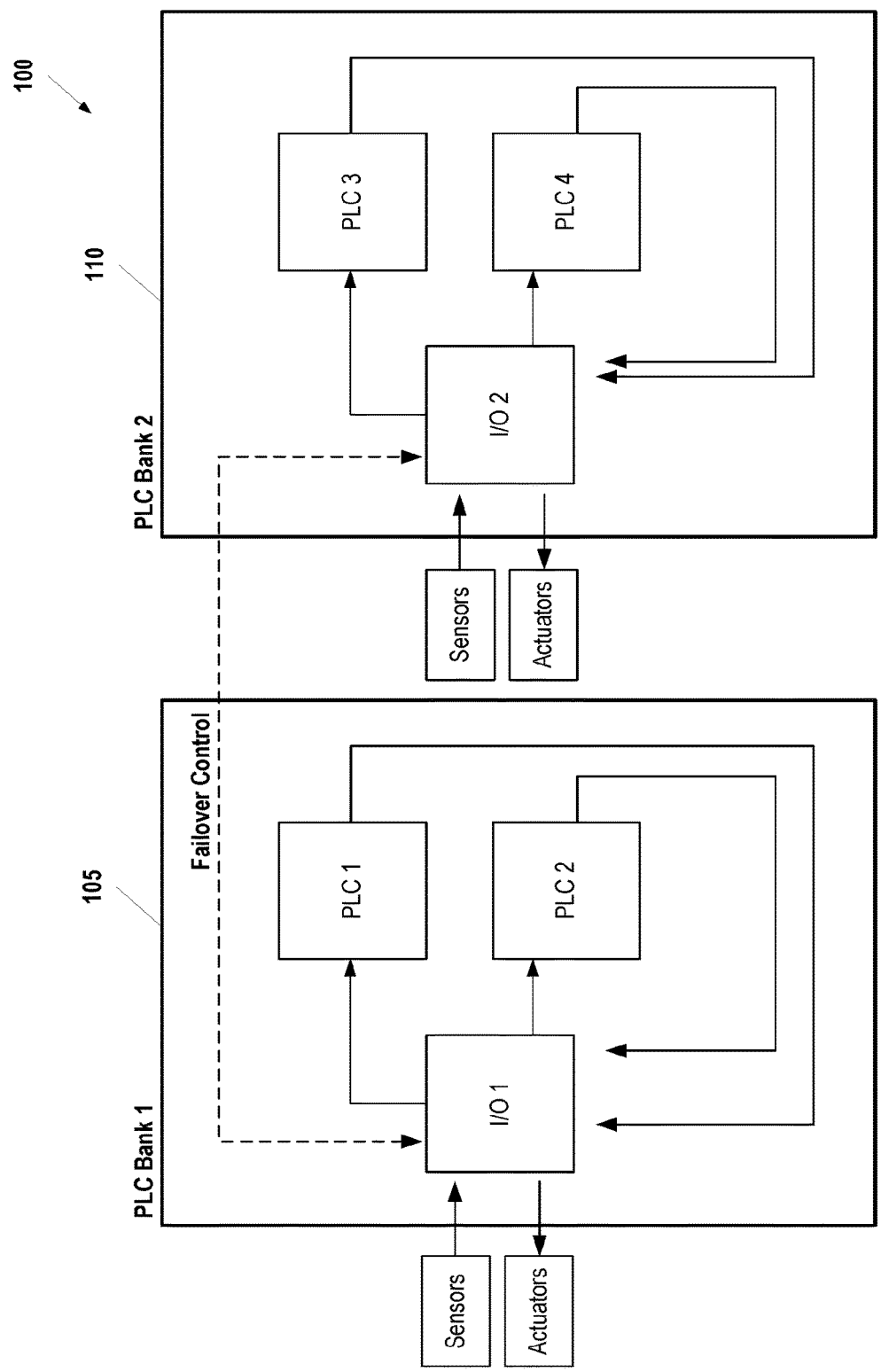
FIG. 1 shows an example failover architecture in a quad-redundant architecture using PLCs, I/O modules, and PLC Banks, according to some embodiments.

FIG. 1 illustrates failover architecture in a quad-redundant architecture 1100, as may be implemented in some embodiments. The architecture 1100 comprises two PLC Banks (PLC Bank 105 and PLC Bank 110). Each PLC bank includes two PLCs and an I/O Module. Thus, PLC Bank 1105 includes PLC 1, PLC 2, and I/O 1, while PLC Bank 110 includes PLC 3, PLC 4, and I/O 2. The failover mechanism can be implemented directly in the I/O modules. One example of an I/O module which may be used for this purpose is a Siemens™ ET200SP I/O module. In some instances, I/O modules may be programmed in a similar way to the way a PLC is programmed using high-level languages. Each PLC bank comprises one I/O module, and two PLCs. The two PLC banks communicate with each other in case of failover (e.g., through PROFINET communication) managed by the I/O modules (e.g., I/O 1 and I/O 2). The I/O modules are connected to the sensors and actuators of the system in a redundant way.

Figure 2:
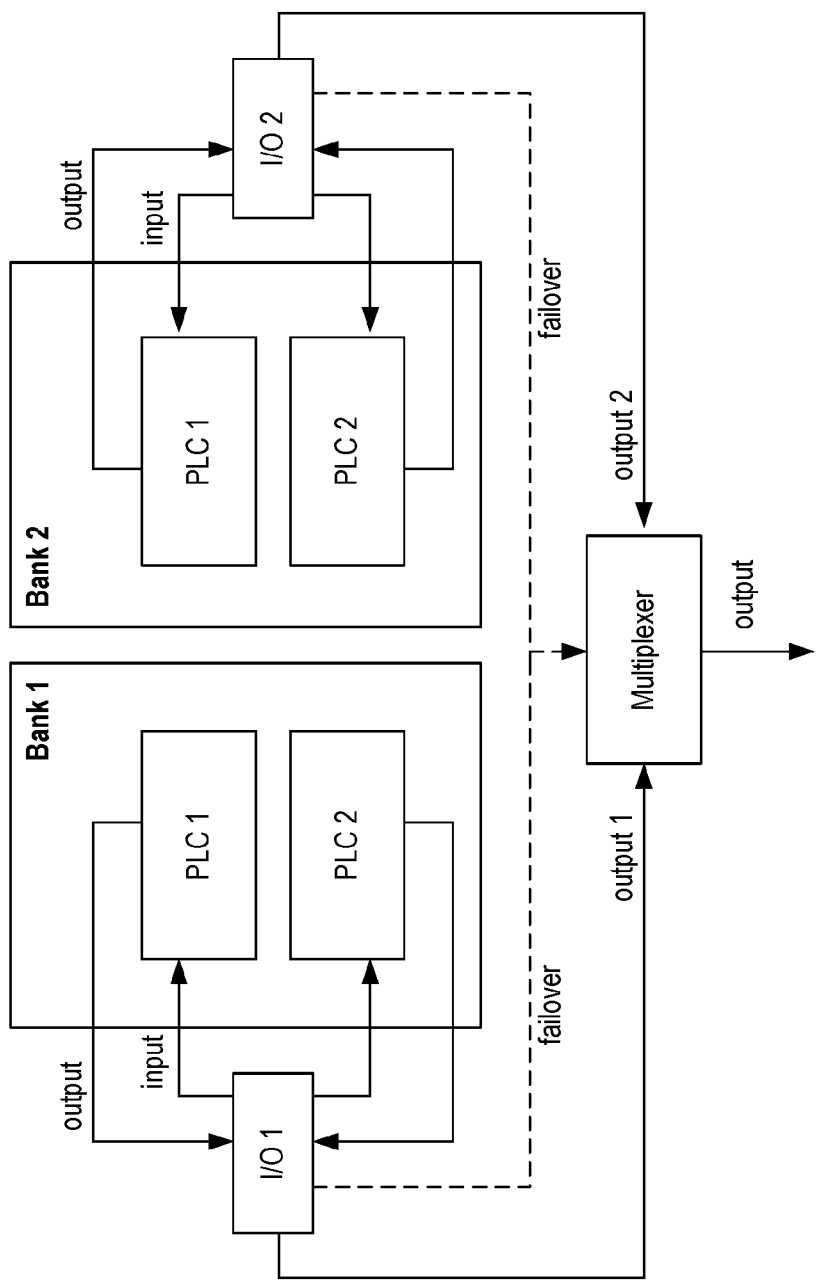
FIG. 2 shows an example of how failing-over from one PLC Bank to another within the same cycle may be achieved by a multiplexer, according to some embodiments.

Failing-over from one PLC Bank to another within the same cycle may be achieved by a multiplexer, as shown in FIG. 2. This multiplexer takes the outputs of bank 1 and 2, as well as a failover signal as input. Depending on which bank is active, the failover signal selects which of the output signals will be the output of the multiplexer. The failover signal is set by the I/O of the bank. The I/O of one bank decides to fail-over to the other bank when it sees that the outputs of the two PLCs differ. The I/O then commands the multiplexer to pass on output from the second bank. The fail-over from one bank to the other can be done in the same cycle. This is because the multiplexer is a simple device without any logic and selecting an output only involves setting the state of the multiplexer.

Figure 3:
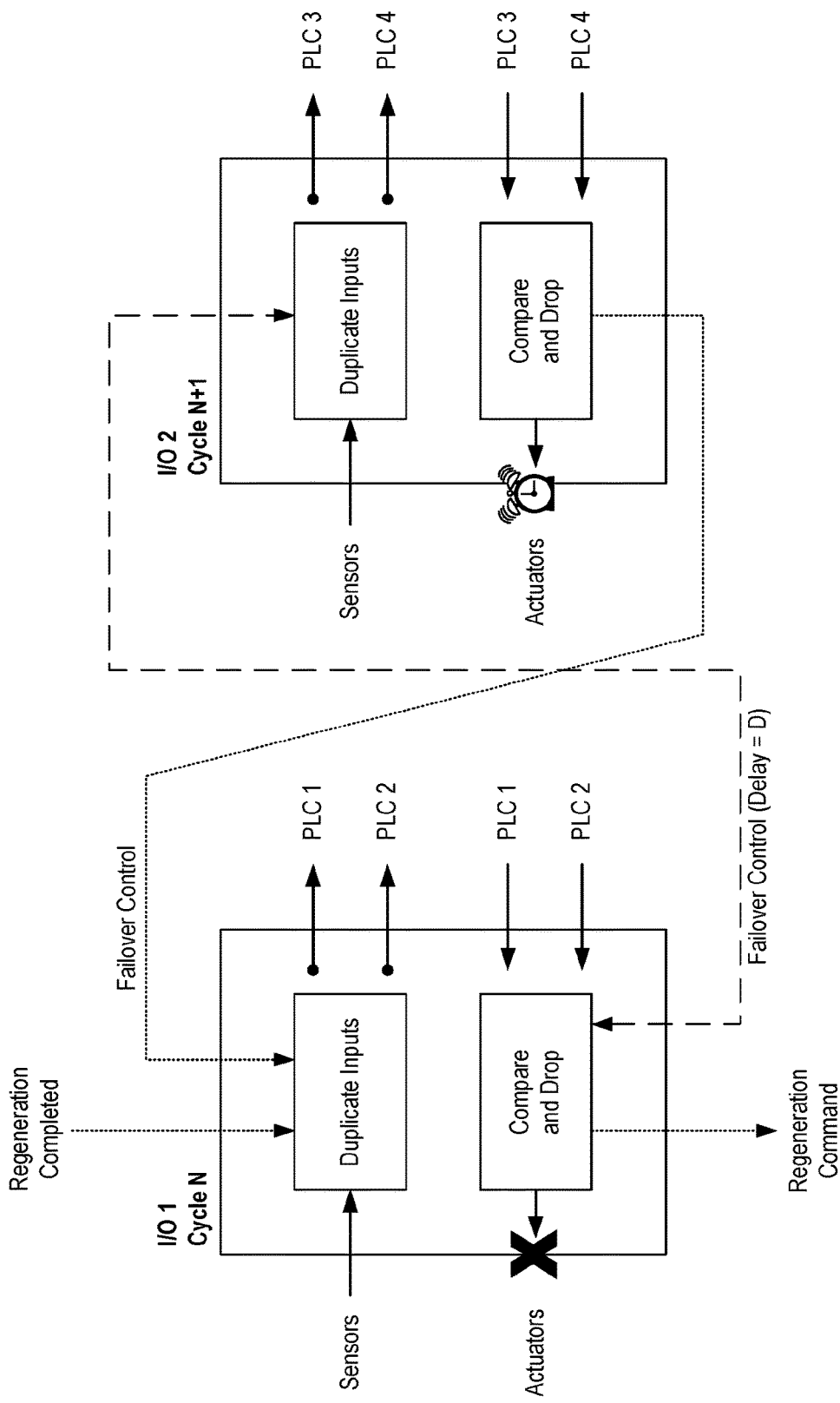
FIG. 3 provides an example of how failover control algorithms may be implemented in I/O modules, according to some embodiments.

FIG. 3 provides an example of how failover control techniques may be implemented in I/O modules, according to some embodiments. As shown in FIG. 3, each I/O module includes a duplicate inputs programming component and a compare and drop programming component. The duplicate inputs programming component takes the sensor data via a sensor input port (not shown in FIG. 3). This input port is essentially a pathway into and out of the I/O module and may be implemented using any technique known in the art. The duplicate inputs programming component at I/O module duplicates the sensor data to the pair of PLCs in each bank. The compare and drop programming components each detect PLC processing inconsistencies and send a failover message to the other PLC bank to resume control and drop the outputs for D cycles. In Cycle N, the I/O 1 module is in control, duplicates the inputs to PLC1 and PLC2, and after the PLC 1 and PLC 2 commit their results for the cycle, the compare and drop programming component validates that the calculations mismatch. In this case, the compare and drop programming component deactivates the devices (PLC 1 and PLC 2), disables the actuators port, and sends a regeneration command for the PLC images to be restored using new diversified binaries. In some embodiments, the regeneration command may be a simple message indicating the need to regenerate which may then be processed to generate instructions for regeneration. In other embodiments, the regeneration command is one or more computer executable instructions which, upon execution, cause regeneration to commence.

The recovery method is performed in two steps. During the first step, I/O 1 triggers the recovery process. This can be done, for example, with the SFC12 system function call in I/O 1. After the devices are deactivated and the actuators disabled, a failover control message is sent to the I/O 2 module in the second PLC bank. The message contains an integer value that specifies the number of cycles D to drop before the second PLC bank writes outputs to the process. This delay message is processed by the I/O 2 and it is used to decide which devices to be activated and when.

Because the I/O 2 module also runs in sync with the rest of the PLCs, the delay D is guaranteed to be accurate. During the second step, after D cycles, the I/O 2 enables the actuator port and the control signals can be written to the actuators to resume control of the physical system. Notice that the I/O 2 module is connected back to the I/O 1 module through failover control signals. However, this connection does not take effect until the PLC images in the PLC Bank 1 are ready; this is communicated through a regeneration complete message. In some embodiments, the regeneration command may be a simple message indicating that all PLCs are ready (e.g., a binary value with 1 indicating ready); while, in other embodiments, the regeneration complete message may include additional information regarding the status of the PLCs in the bank.

The reason why the two PLCs with randomized programs generate different outputs when a cyber-attack takes place is because the PLCs use a different calling convention than general purpose computers. For example, return addresses are not stored in the stack, but in a register associated with a runtime data structured in the heap in a protected memory area. This is managed in the kernel space and not in the user-space by the PLC operating system.

Figure 4:
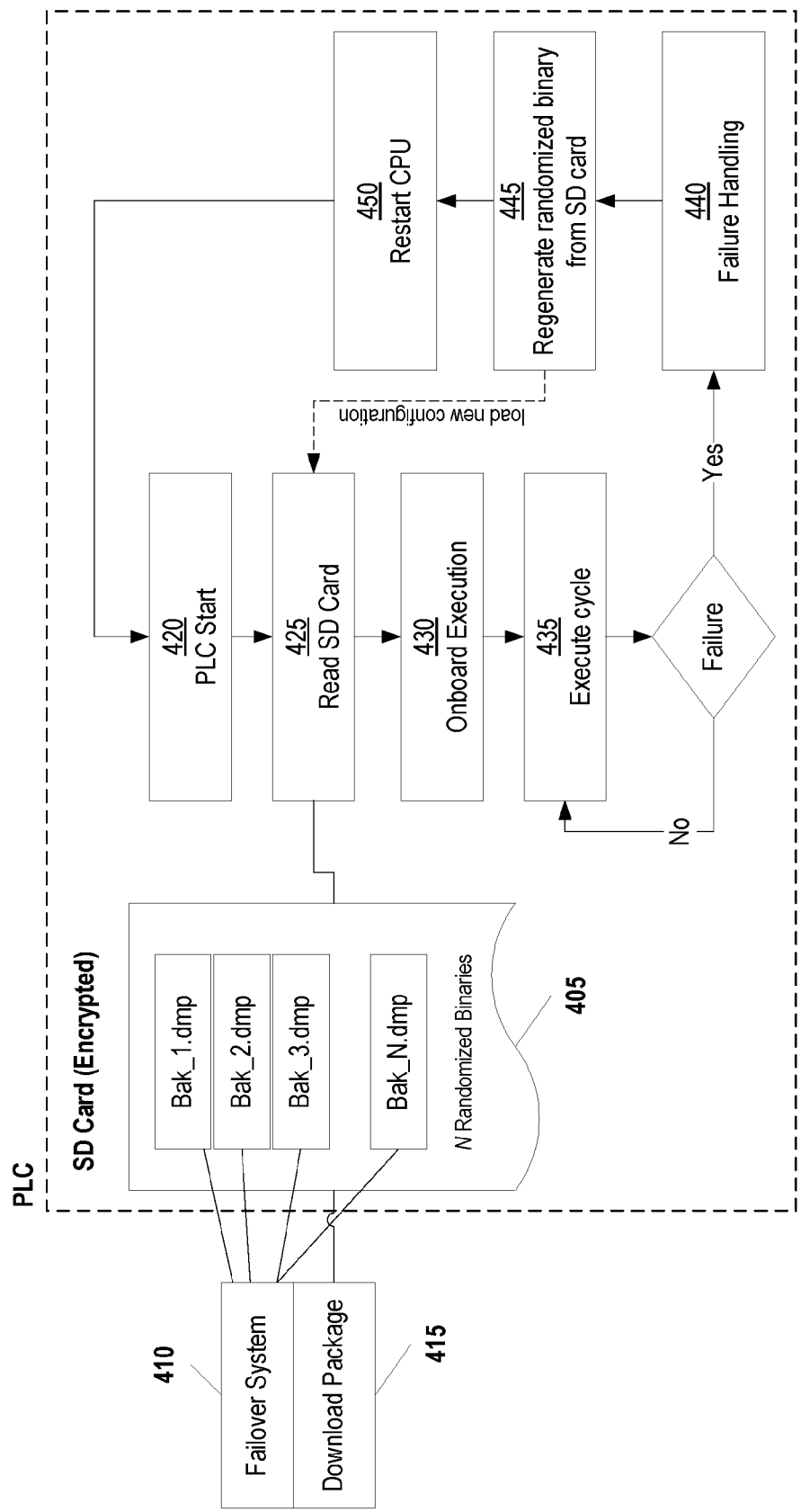
FIG. 4 illustrates PLC randomized binary regeneration using multiple backups in the SD card, according to some embodiments.

The regeneration process within the PLC will be accomplished as shown in FIG. 4. This process may be implemented, for example, using a specialized regeneration programming component executed in the operating system or firmware of the PLC. In this example, the PLC uses an SD Card 405 to store the program configurations (labeled "Bak_1.dmp," "Bak_2.dmp," etc.). In some embodiments, such as illustrated in the figure, the SD Card 405 may be encrypted. These randomized program configurations generated by failover system 410 are randomly downloaded to the PLC via a download package 415. Failover system 410 in this example comprises software components which parse the PLC structure, apply transformations, and package a new PLC structure. Randomizing the selection of randomized PLC binaries is important to reduce the chances of duplicating a cyber-attack that caused a previous fault. These randomized configurations are also encrypted in the SD Card 405, for example, using the "know-how protection" feature of PLCs. After the PLC Start at step 420, a configuration on the SD Card 405 is read and instantiated into the PLC memory at step 425. This configuration is then compiled by the onboard compiler at step 430 before being executed cyclically at step 435. In case of a failure, the failure handling mechanism is triggered to accomplish local failover at step 440. Also, the PLC must regenerate its image and this is accomplished by randomly selecting a different configuration at step 445. Any technique generally known in the art may be used for performing the random selection of configurations. For example, in some embodiments, the randomized program configurations on the SD Card 405 are sequentially numbered. Then, a random number is selected within the range of numbers. Once selected, the identifier (e.g., filename) of the configuration is delivered to the programming component that performs the read of the SD Card at 425. Alternatively, step 425 may be performed to load the configuration immediately. Finally, at step 450, the CPU of the PLC is restarted at the process repeats at step 420.

This process shown in FIG. 4 may be fully supported by state-of-the-art PLCs and additional code is not needed. An additional layer of security that may be supported by PLCs is to bind the SD card serial number to a user program to prevent anyone from replicating the same PLC binary image to a different PLC.

Figure 5:
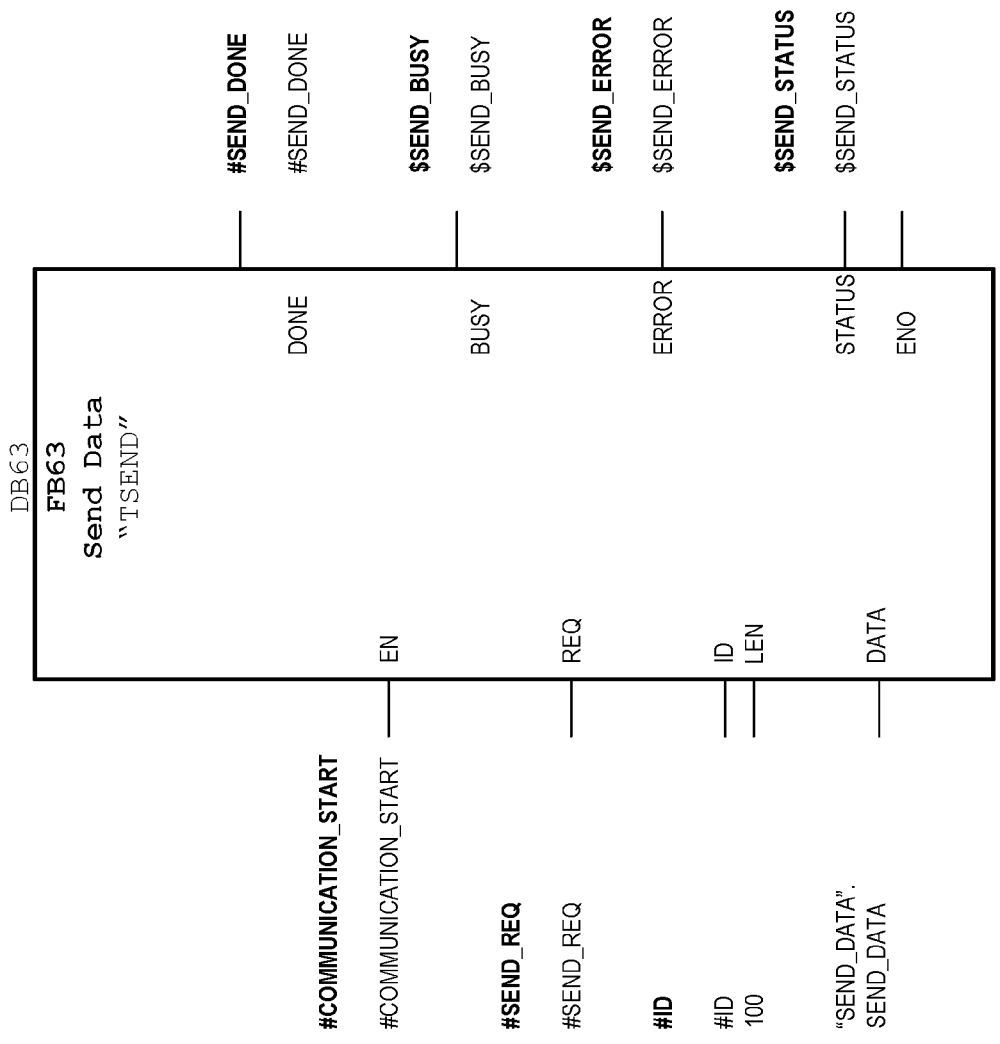
FIG. 5 provides an example TSEND block that allows a system to implement user-defined protocols over Industrial Ethernet and TCP.

In some embodiments, a user-defined communication protocol is used for all the components to exchange messages containing instructions and their status. The components include the PLCs, the firewall, the engineering system, the PLC input filters, the I/O modules, and the failover algorithms. In Siemens automation components, user-defined communication protocols can be created using the "Open User Communication" via Industrial Ethernet TCP protocol. Siemens TIA Portal Engineering System, for example, provides the so called "T blocks" in the Standard Library to enable user-defined communication. For example, FB65 "TCON" is used to establish a connection, FB66 "TDISCON" is used for ending a connection, FB63 "TSEND" is used for sending data, and FB64 "TRECV" is used for receiving data. FIG. 5 shows an example of the FB63 "TSEND" block. The user-defined message is sent to the input parameter DATA, and the message length to the input parameter LEN. In this example, the message is stored in DB100 data block and is 100 bytes long. The send request is triggered by a positive edge at the input parameter "REQ". If the send request is running, the "SEND BUSY" variable is set. The output parameters "DONE", "ERROR", and "STATUS" are required to evaluate the execution of FB63.

Figure 6:
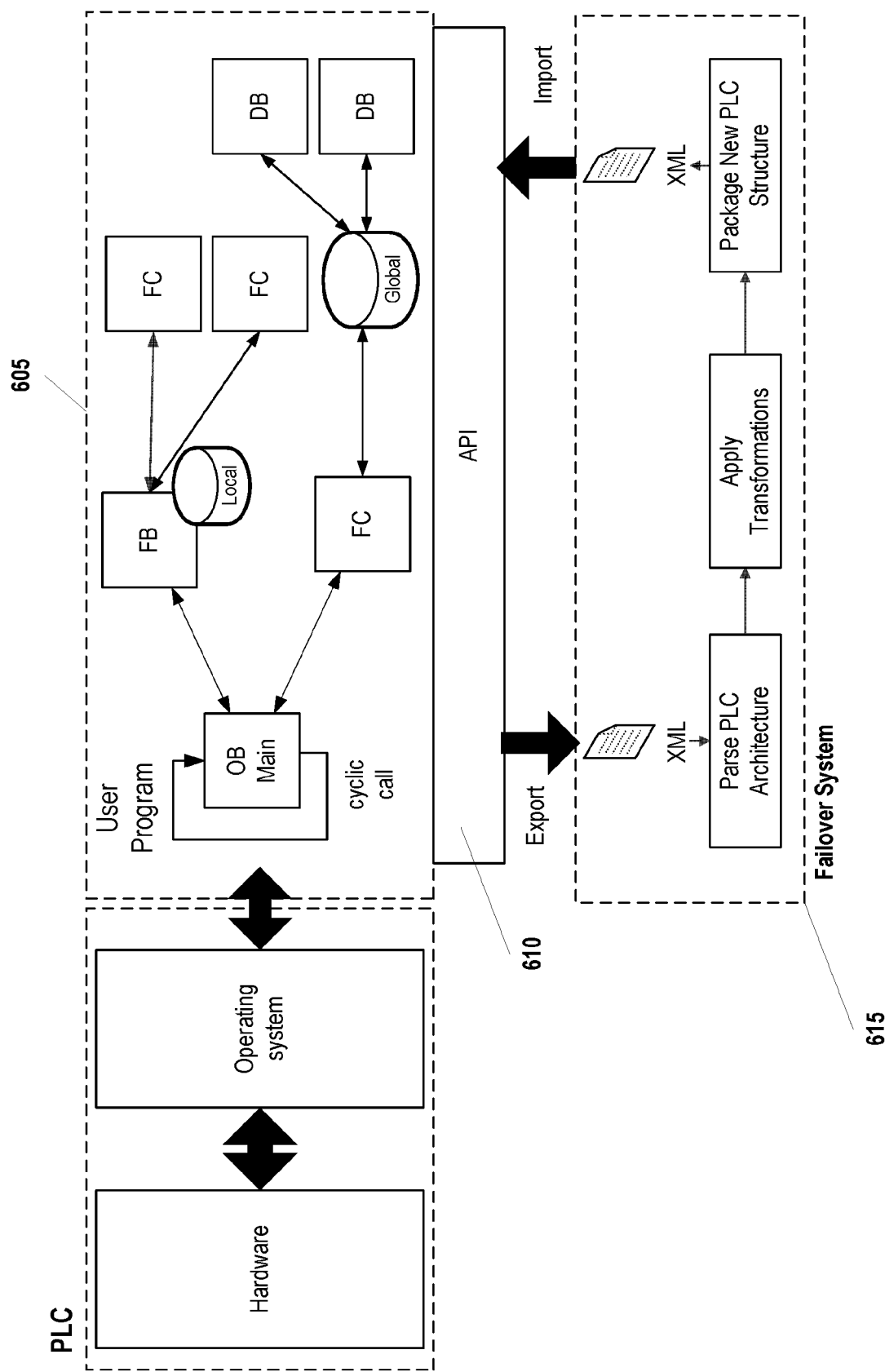
FIG. 6 provides an illustration of PLC program randomization implemented through an API, according to some embodiments.

FIG. 6 is a system diagram which provides additional details of how PLC program randomization may be implemented, according to some embodiments. As is understood in the art, a PLC comprises an operating system and a user program. The operating system provides the intrinsic PLC functionality (e.g., handling of restart and errors, memory management, calling the user program, etc.). As shown in FIG. 6, the user program comprises all "blocks" that perform the automation task. The user program is programmed with program blocks including Function Blocks (FB) and Functions (FC). FBs and FCs reference local and global variables organized in Data Blocks (DB). In PLCs, the user program is typically executed cyclically (non-cyclic programs are also possible) in an Organization Block (OB). The main cycle OB always exists and it is available when a PLC program is initialized and executed in an infinite loop.

Figure 7:
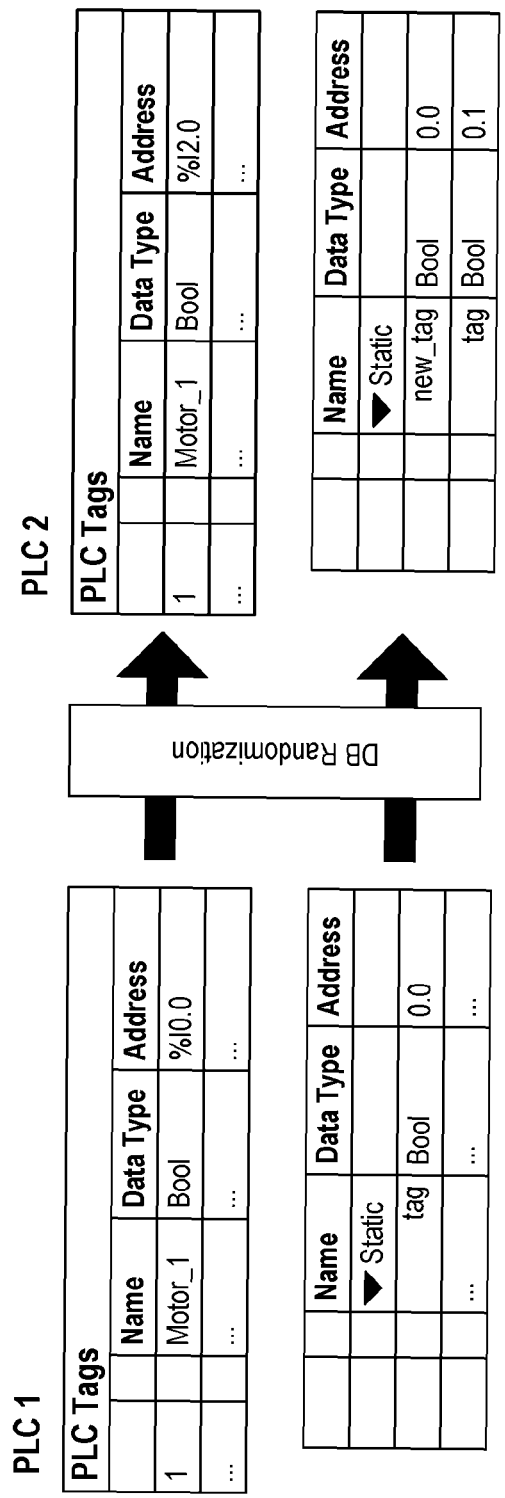
FIG. 7 shows a data block randomization changes the address and offset of data block (DB) variables, which may be utilized in some embodiments.

The PLC program structure shown in FIG. 6 is fixed and provides a clear structure with different block types. This example illustrates the method to connect a failover system 615 to an Engineering System 605. Failover system 615 in this example comprises software components which parse the PLC structure, apply transformations, and package a new PLC structure. More specifically, using an Application Programming Interface (API) 610, failover system 615 accesses and randomizes the PLC program before it is downloaded. Modifying the block structure of a PLC program has a profound effect in the generated code because the mappings of blocks (OB, FB, FC, DB) to binary representation change. Therefore, modification to the PLC program structure achieves the binary diversification sought by the failover system. Using the general architecture set forth in FIG. 6, randomization of all block types in the PLC program structure may be achieved FIG. 7 illustrates how block randomization changes the address and offset of DB variables, according to some embodiments. DBs organize the memory in addressable blocks that are used by the program to access variables, sensors, and actuators. A DB is a collection of named variables referred to as Tags. Tags are reserved memory areas for values in the PLC. Tags contain a data type (e.g., Bool, Integer, etc.), a value (e.g., "15"), and a physical address in the DB. As shown in FIG. 2, the "Motor_1" tag in PLC 1 has a Bool type and an address "%I0.0". After processing by the Data Block Randomization Component, the address of the same variable in PLC 2 can be changed to "%I2.0". Similarly, the offset in static variable "tag" in PLC 1 of Bool type can be changed from "0.0" to "0.1" by introducing the "new_tag" before "tag" in the symbol table in PLC2. These changes diversify the memory layout in a PLC in such a way that the same cyber-exploit is less likely to be effective in two PLCs with different memory layouts.

Figure 8:
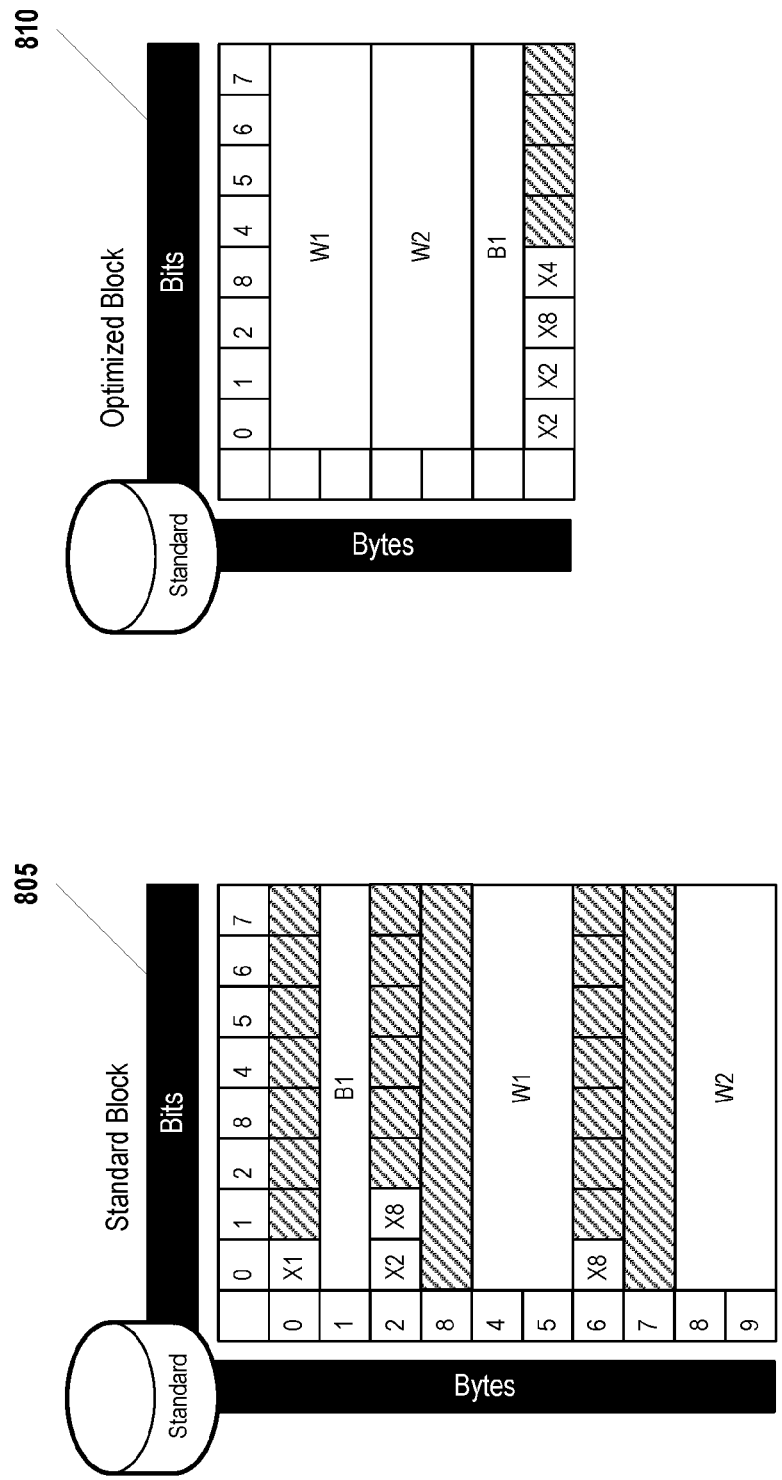
FIG. 8 shows how DB block optimization eliminates memory padding and re-arranges the memory layout, according to some embodiments.

An additional layer of randomization is to enable the DB block optimization where all tags are sorted by their data type. The sorting minimizes the data gaps (padding) between tags and optimizes the memory access for the target PLC processor as shown in FIG. 8. In this example, the Standard DB 805 has data gaps between variables that are eliminated in the Optimized DB 810. In combination, the two presented DB randomization techniques allow the failover system to generate hundreds of equivalent memory layouts for PLC diversified programs.

In some embodiments, function block and function randomization is used to change the structure of both the code and memory stack. The difference between FB and FC lies in the cyclic data storage. FCs are blocks without data storage. This means that the values FCs are stateless and the block variables cannot be persisted over cycles. And FBs, on the other hand, are blocks with cyclic data storage. This means that FBs are stateful and block variable values are persisted over cycles. Both FB and FC are programmed using a variety of high-level languages including graphical and textual languages. One of the standard PLC programming languages is the Structured Control Language (SCL) which is based on PASCAL. SCL is also based on the Structured Text (ST) specification for PLC programming standardized by the IEC 61131-3 standard. The FB and FC randomization techniques described below are based on SCL for illustration purposes; however, it should be understood that these techniques may be generalized and applied to any PLC programming language which provides similar functionality.

Figure 9:
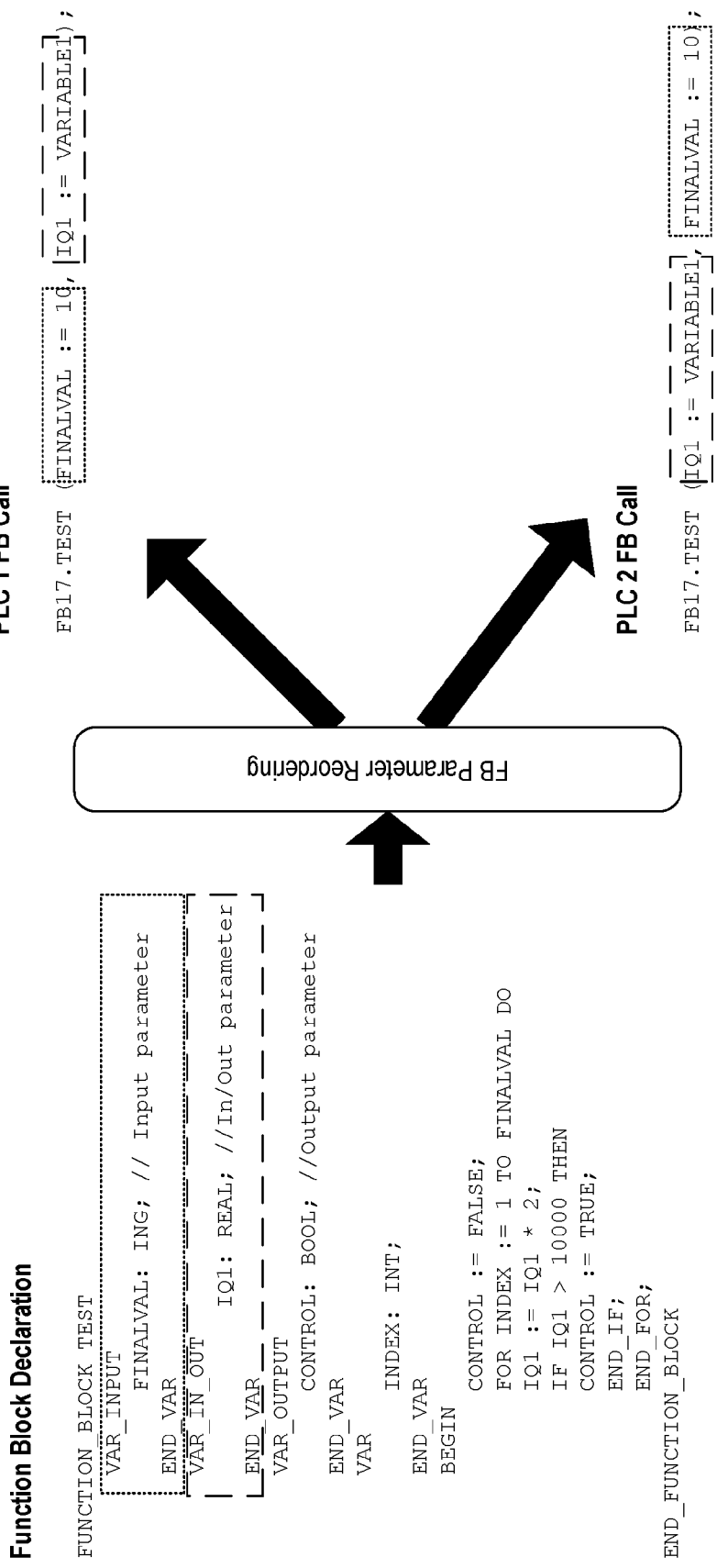
FIG. 9 provides an illustration of how function block parameter reordering changes the binary representation of PLC programs, according to some embodiments.

Function blocks and functions have a declaration comprising input, output, in-out parameters, and the body of the function. This declaration is common to all languages, including SCL. FIG. 9 shows an exemplary function block declaration for a "TEST" program comprising an input parameter "FINALVAL", an in-out parameter "IQ1", and an output parameter "CONTROL". One technique to introduce randomization is to reorder the parameters when calling the function block as shown by the two examples on the right. Because the parameters are named, the order in which the parameters are listed does not change the meaning of the program. However, this creates a different memory layout for the two programs. In real PLC programs, the number of parameters tends to be very large (sometimes hundreds of parameters), and therefore this technique can be very effective in creating a large number of different but equivalent SCL programs.

A similar technique is applicable to FB's cyclic variables that are persisted across cycles. FIG. 10 illustrates how cyclic variable reordering introduces binary changes to the PLC binary programs, according to some embodiments. As shown in FIG. 10, the order of the variables PID_CONTROLLER_1 and PID_CONTROLLER_2 can be rearranged such that cyclic variables occupy different memory locations in different PLC instances.

The SCL code itself can be randomized in both the control flow and data flow levels. For example, for the control flow, the extensible markup language (XML) file containing the SCL statements may be parsed and the control flow graph may be reconstructed where conditional statements are transformed into equivalent control flow constructs.

FIGS. 11A and 11B show how control flow and data flow transformations, respectively, introduce binary diversification at the SCL code level, according to some embodiments. In FIG. 11B, for example, the structure of the if-else statement is inverted with a "NOT" instruction such that the body of the "if" statement in PLC 1 becomes the body of the else statement in PLC 2, and vice-versa. In FIG. 11B, for data flow, the XML file containing the SCL statement may be parsed, and the data flow graph may reconstructed where expressions are transformed into equivalent data flow expressions. For example, FIG. 7 shows that the expression "IQ1:=IQ1*2" in PLC 1 is transformed into "IQ1:=IQ1+ IQ1" in PLC 2. Additionally, additional expressions such as "N:=0" and "SUM:=0" may be inserted that do not contribute to the control program but generate binary diversity at the code level when compiled. This is similar to a NOOP (no-operation) randomization technique. It is important to note that NOOP operands do not exist in some PLCs but inserting operations that do not contribute functionally to the program is functionally equivalent.

In some embodiments, an ordering randomization technique for FBs and FCs is applied that affects their arrangement in memory. Every FB and FC has a triple <name, type, number>, where name is an arbitrary name provided by the user in the PLC program, the type is an enumeration depending on the block type (e.g., FB, FC, OB, DB), and number is a unique identifier associated to the block. The key observation is that the locations of blocks in the PLC memory correspond to their number as they are first sorted and then downloaded to the PLC for execution. Thus, an ordering randomization technique may be applied to randomize the number in the triples to change their order during execution. Additionally (or alternatively), dummy FCs and FBs may be inserted to take up memory space and arbitrarily move other FBs and FCs that provide useful work. This transformation is also possible through the open interfaces and can also be extended to DBs.

OBs are the interface between the operating system and the user program. User programs can only be called by an OB and therefore are an important part of the PLC program structure. OBs are called by the operating system cyclically or when certain events occur. In most PLCs, there are several types of OBs (or a similar concept in other vendors) that the user can choose for their programs depending on the desired functionality. For example, there are startup OBs, cyclic program execution OBs, interrupt (time-of-day, cyclic, time-delay, hardware) OBs, and error (asynchronous and synchronous) OBs. OBs are identified by a number, and different numbers have different priorities. For example, "OB 1" is the cyclic program OB with the highest priority, and OB 10 is a time-of-day interrupt OB with a lower priority. For example, Some PLCs provide multiple interrupts of the same type, for example, in Siemens PLCS, OB 32, OB 33, OB 34, and OB 35 are cyclic interrupt OBs that users have at their disposal to organize their program.

Figure 12:
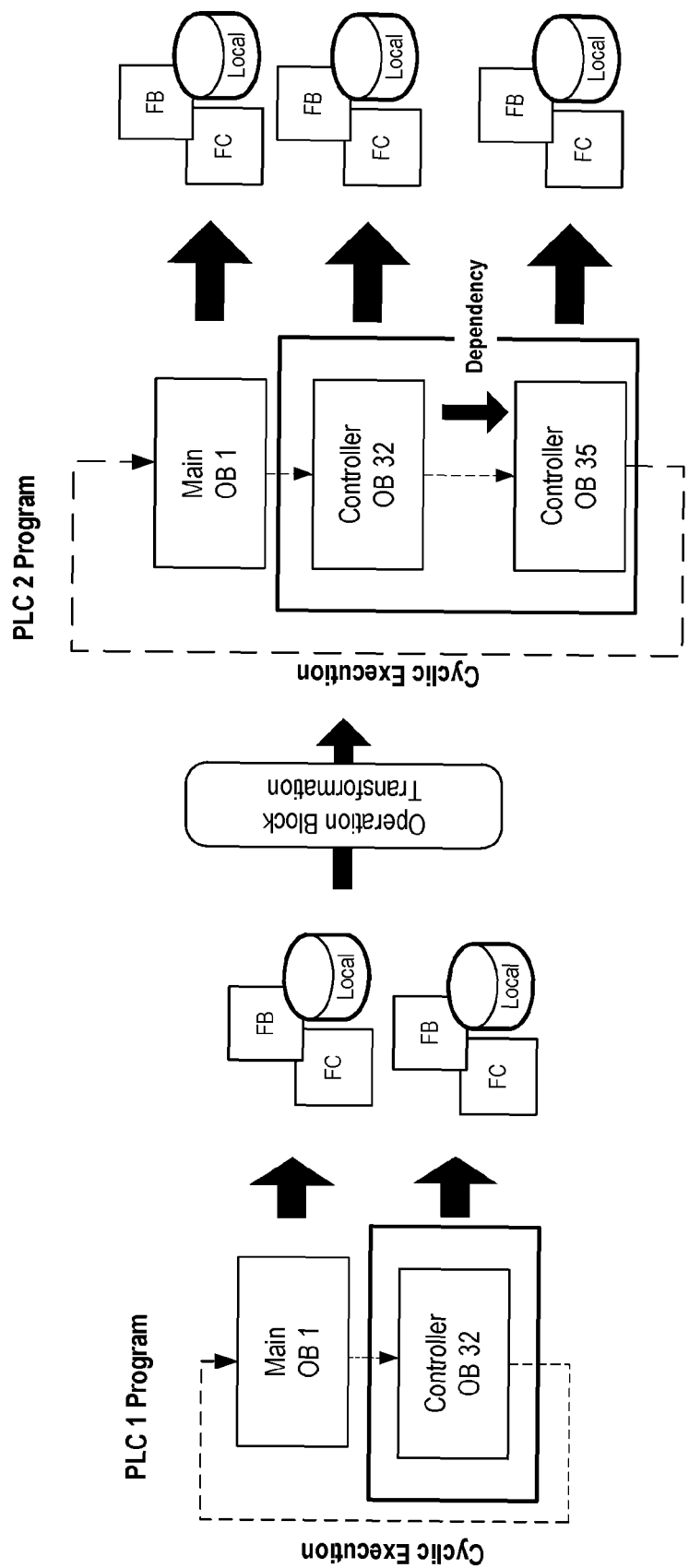
FIG. 12 provides an illustration of operational block randomization introduces variability in the timing and priority of OBs, according to some embodiments.

The Organization Block Randomization Component reorders the OBs such that different PLC programs use different OBs (with the same priority and real-time guarantees). For example, FIG. 12 shows how a PLC program structure with two OBs (OB 1 and OB 32) can be transformed into a program structure with three OBs (OB 1, OB 32, and OB 35). In this example, the Controller code is split into two and the first half is assigned to OB 32, and the second half is assigned to OB 35. Notice that this creates a dependency between OB 35 and OB 32. However, synchronization between OBs is supported in PLCs.

In some embodiments, onboard PLC randomization realizes the application binary concealment after the PLC program is randomized and deployed to the PLC for execution. Because a conventional engineering system can fetch the PLC program and "decompile" it to see the source code, an attacker can use this to read all the randomized programs, manipulate them at their convenience, and re-deploy. To address this concern, an additional randomization layer may be implemented in the PLC program directly on the PLC; hence the "onboard" denominator. This layer will guarantee that, even if an identical PLC program is deployed into multiple PLCs, the execution of each individual instance is different. The onboard PLC randomization and the PLC program randomization discussed above are orthogonal and can be used individually or in combination. The key advantage is that what the engineering system sees is not what is executed in the PLC.

The following paragraphs describe onboard PLC randomization in PLCs using commercially available interfaces that allow the modification of firmware through a C/C++ language interface known as S7-1500 Open Developer Kit (ODK). The ODK provides software developers with access to function and resources of the PLC operating system, as well as external hardware and software components. A software application developed using the ODK is referred to herein as an "ODK application." ODK applications can be used just like normal system functions in PLC programs.

ODK applications run in a sandbox and the PLC operating system prevents them from breaking out from the sandbox. The only allowed interface to ODK programs is the inputs and outputs. It should be noted that, although ODK is used as an example for illustration purposes, the general techniques described below could be implemented using similar language interfaces generally known in the art.

Figure 13:
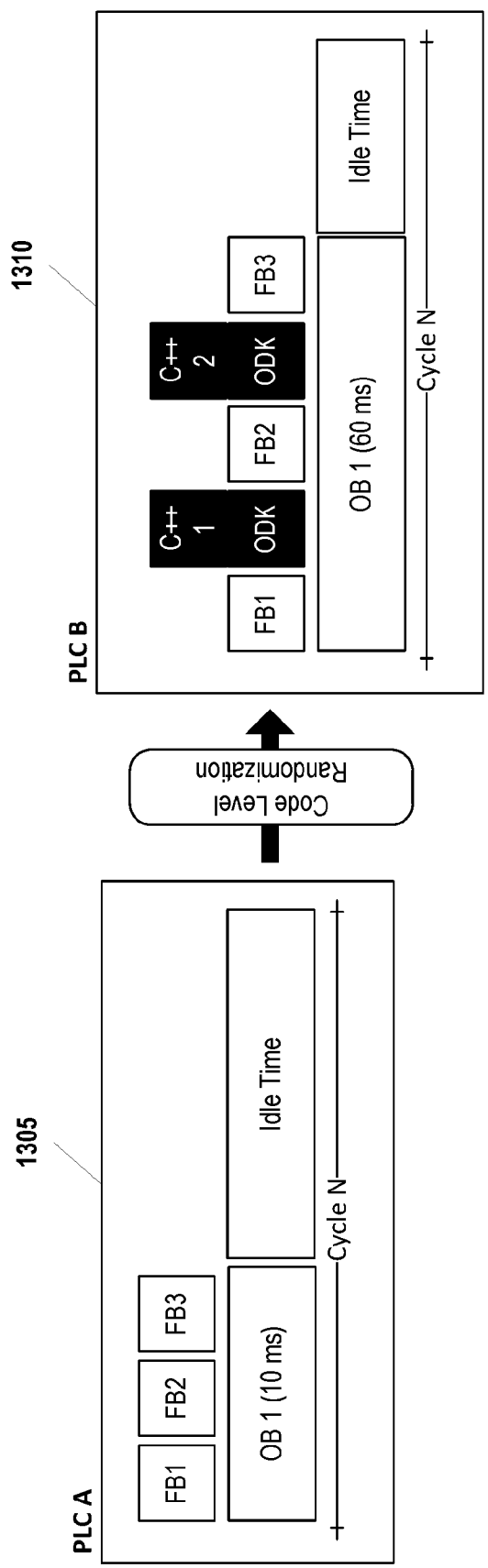
FIG. 13 provides an example of code-level randomization that executes additional code within a PLC program to change its execution and affects the timing of the PLC, as may be implemented in some embodiments.

FIG. 13 illustrates code-level randomization that executes additional code within a PLC program to change its execution and affects the timing of the PLC, according to some embodiments. Consider a PLC A 1305 comprising three FBs (FB1, FB2, FB3) running in OB 1 cyclically as shown on the left hand side of FIG. 13. The code-level randomization for PLC B 1310 (shown on the right hand side of FIG. 13) allows the execution of additional C/C++ code (C++ 1) via an ODK application inserted after FB1, and a different C/C++ code (C++ 2) via an ODK application inserted after FB2, and then calling FB3 in OB 1. This illustrates how the same PLC program can be randomized in two different PLCs by varying the number and content of C/C++ code to be called between FB and FCs within an OB. Clearly, additional code introduces additional computation requirements for the OB. For example, the OB 1 in PLC A 1305 is executed in 10 ms whereas the randomized OB 1 in PLC B is executed in 60 ms. As long as the additional code inserted by the code-level randomization does not exceed the cycle time, the randomized will be functionally and real-time compliant. This is possible due to the fact that OB execution can take the Idle Time within a cycle without affecting the real-time guarantees of the control application. This observation can be leveraged to introduce additional code.

Figure 14:
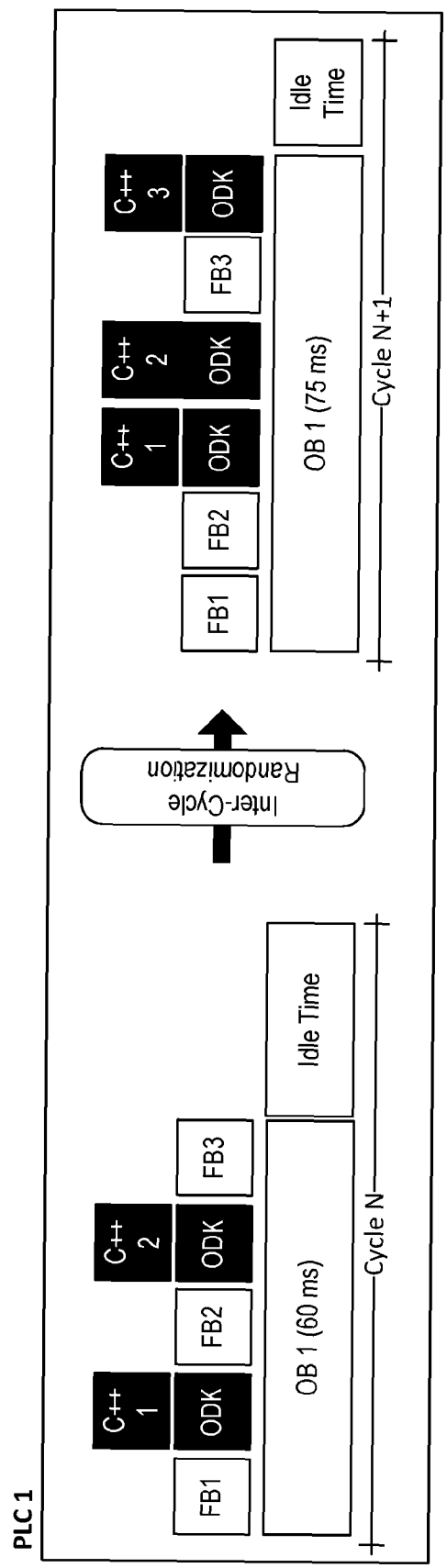
FIG. 14 provides an example of inter-cycle randomization that executes different fragments of additional code within cycles and affects the timing of the PLC, as may be implemented in some embodiments.

Between cycles, inter-cycle randomization can be introduced such that both, the location and number of ODK calls vary. Thus, the execution morphs from cycle N to the next cycle N+1 in the same PLC. For example, FIG. 14 shows that in cycle N, the execution comprises FB1, C++ 1, FB2, C++ 2, and FB3 in OB1 in 60 ms. In the next cycle N+1, the execution comprise FB1, FB2, C++ 1, C++ 2, FB3, and C++ 3 in OB1 in 75 ms. Similar to the code-level randomization, ODK calls trade OB execution for Idle Time, and as long as the execution is within the cycle time, the inter-cycle randomization will guarantee functional and real-time guarantees.

The processors described herein as used by control layer devices may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

As used herein, the term "programming component" refers to any combination of software, firmware, and hardware that is programmed, or otherwise configured, to provide specified functionality. For example, in some embodiments, each programming component comprises a software library or group of libraries. In some instances, programming components are included in a larger overall programming structure. For example, the functionality of a programming component may be included in one or more functions, modules, subroutines, or object oriented classes that, in turn, are part of a larger software program. In other embodiments, programming components are atomic in nature and can be loaded and executed, as needed by a computing system processor. The functionality of any given programming component of the present disclosure may be distributed among multiple programming components that are connected, for example, via wired or wireless interfaces.

Various devices described herein including, without limitation, the control layer devices and related computing infrastructure, may include at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio wave and infrared data communications.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

The invention claimed is:

1. A method of performing failover for programmable logic controllers in an automation environment and controlling a physical system, the method comprising:
  receiving, by a first input/output module, sensor inputs from one or more field devices;
  creating, by the first input/output module, a copy of the sensor inputs for a first group of programmable logic controllers (PLCs) in a first PLC bank;
  transferring, by the first input/output module, the copy the sensor inputs to each PLC in the first group of PLCs;
  receiving, by the first input/output module, processing results from each PLC in the first group of PLCs in response to transferring the copy of the sensor inputs;
  determining, by the first input/output module, whether there are any inconsistencies between the processing results received from each PLC in the first group of PLCs;
  if there are any inconsistencies between the processing results received from each PLC in the first group of PLCs, initiating a failover control process by sending a failover control message to a second input/output module;
  wherein the failover control process comprises:
    deactivating, by the first input/output module, the first group of PLCs in the first PLC bank;
    disabling, by the first input/output module, one or more output ports of the first group of PLCs in the first PLC bank associated with control of the physical system; and
    sending, by the first input/output module, a failover message to the second input/output module instructing the second input/output module to resume control and drop outputs for a predetermined number of cycles.

2. The method of claim 1, wherein the predetermined number of cycles are specified as an integer value in the failover message.

3. The method of claim 1, further comprising:
  receiving, by, the second input/output module, the failover message;

after the predetermined number of cycles; enabling, by the second input/output module one or more output ports of a second group of PLCs in a second PLC bank associated with control of the physical system.

4. The method of claim 1, wherein the failover control process further comprises:
sending a regeneration command to the first group of PLCs in the first PLC bank instructing the first group of PLCs to be reset.

5. The method of claim 4, further comprising:
selecting, by a PLC n the first PLC bank, a new control application binary file from a group of application binary files stored on the PLC n response to receiving the regeneration command;
compiling, by the PLC, the new control application binary file into an executable file;
transmitting a regeneration compete message to the first input/output module; and
executing, by the PLC, the executable file.

6. The method of claim 5, wherein each application binary file in the group of application binary files is distinct and functionally equivalent to other application binary files in the group.

7. The method of claim 5, wherein at least a portion of the new control application binary file is randomized during compilation.

8. The method of claim 4, further comprising:
transmitting, by the second input/output module, a new failover control message to the first input/output module;
receiving, by the first input/output module, a regeneration complete message from each PLC in the first group of PLCs;
in response to receiving the new failover control message and the regeneration complete message, enabling, by the first input/output module, the one or more output ports of the first group of PLCs ire the first PLC bank associated with the physical system.

9. A system for performing failover for programmable logic controllers in an automation environment and controlling a physical system, the system comprising:
a first input/output module; and
a second input/output module,
wherein the first input/output module comprises:
a sensor input port configured to receive sensor inputs from one or more field devices; a duplicate inputs programming component configured to:
create a copy of the sensor inputs for a first group of programmable logic controllers (PLCs) in a first PLC bank and
transfer the copy the sensor inputs to each PLC in the first group of PLCs; and
a PLC input port configured to receive processing results from each PLC in the first group of PLCs in response to transferring the copy of the sensor inputs;
a compare and drop programming component configured to:
determine whether there are any inconsistencies between the processing results received from each PLC in the first group of PLCs; and
if there are any inconsistencies between the processing results received from each PLC in the first group of PLCs, initiate a failover control process by sending a failover control message to the second input/output module, wherein, as part of the failover process, the compare and drop programming component is configured to execute:
deactivating the first group of PLCs in the first PLC bank, and
disabling one or more output ports of the first group of PLCs in the first PLC bank associated with control of the physical system, and
sending a failover message to the second input/output module instructing the second input/output module to resume control and drop outputs for a predetermined number of cycles.

10. The system of claim 9, wherein the predetermined number of cycles are specified as an integer value in the failover message.

11. The system of claim 9, wherein the second input/output module is configured to:
receive the failover message; and
after the predetermined number of cycles, enable one or more output ports of a second group of PLCs in a second PLC bank associated with control of the physical system.

12. The system of claim 9, wherein, as part of the failover process, the compare and drop
component is further configured to execute:
send a regeneration command to the first group of PLCs in the first PLC bank instructing the first group of PLCs to be reset.

13. The system of claim 12, further comprising:
a PLC n the first PLC bank, wherein the PLC comprises:
a non-volatile memory storing a group of application binary files stored on the PLC;
a regeneration programming component configured to execute n response to receiving the regeneration command:
select a new control application binary file from the group of application binary files stored on the PLC n response to receiving the regeneration command;
compile the new control application binary file into an executable file;
transmit a regeneration complete message to the first input/output module; and execute the executable file.

14. The system of claim 13, wherein each application binary file in the group of application binary files is distinct and functionally equivalent to other application binary files in the group.

15. The system of claim 13, wherein at least a portion of the new control application binary file is randomized during compilation on the PLC.

16. A programmable logic controller comprising:
a non-volatile memory storing a group of application binary files, wherein each application binary fife in the group of application binary files is distinct and functionally equivalent to other application binary files in the group; and
a regeneration programming component configured to:
in response to receiving a regeneration command from an input/output module, selecting a new control application binary file from the group of application binary files;

compile the new control application binary file into an executable file;

transmit a regeneration complete message to the input/output module; and execute the executable file.

* * * * *